United States Patent [19]

Summers et al.

[11] 4,260,412
[45] Apr. 7, 1981

[54] METHOD OF PRODUCING DIRECT REDUCED IRON WITH FLUID BED COAL GASIFICATION

[75] Inventors: Frank V. Summers; David C. Meissner, both of Charlotte, N.C.; John C. Scarlett, Toledo, Ohio

[73] Assignee: Midrex Corporation, Charlotte, N.C.

[21] Appl. No.: 112,680

[22] Filed: Jan. 16, 1980

[51] Int. Cl.³ ............................................. C21B 13/02
[52] U.S. Cl. .......................................... 75/35; 75/91; 48/202
[58] Field of Search ................ 75/34, 35, 91; 48/202; 266/156

[56] References Cited

U.S. PATENT DOCUMENTS

| | | | |
|---|---|---|---|
| 3,853,538 | 12/1974 | Nemeth | 75/35 |
| 4,095,960 | 6/1978 | Schuhmann, Jr. | 48/202 |
| 4,173,465 | 11/1979 | Meissner et al. | 75/91 |

*Primary Examiner*—M. J. Andrews
*Attorney, Agent, or Firm*—Ralph H. Dougherty

[57] ABSTRACT

A method of producing direct reduced iron with fluid bed coal gasification in which a portion of cooled, recycled gas is used as coolant in the gasification chamber and a second portion of the cleaned recycled gas is heated and mixed with the hot, dust-free gasification gas to form reducing gas for the direct reduction process. Limestone is preferably mixed with the pulverized coal feed to the gasification chamber to desulfurize the gas.

6 Claims, 1 Drawing Figure

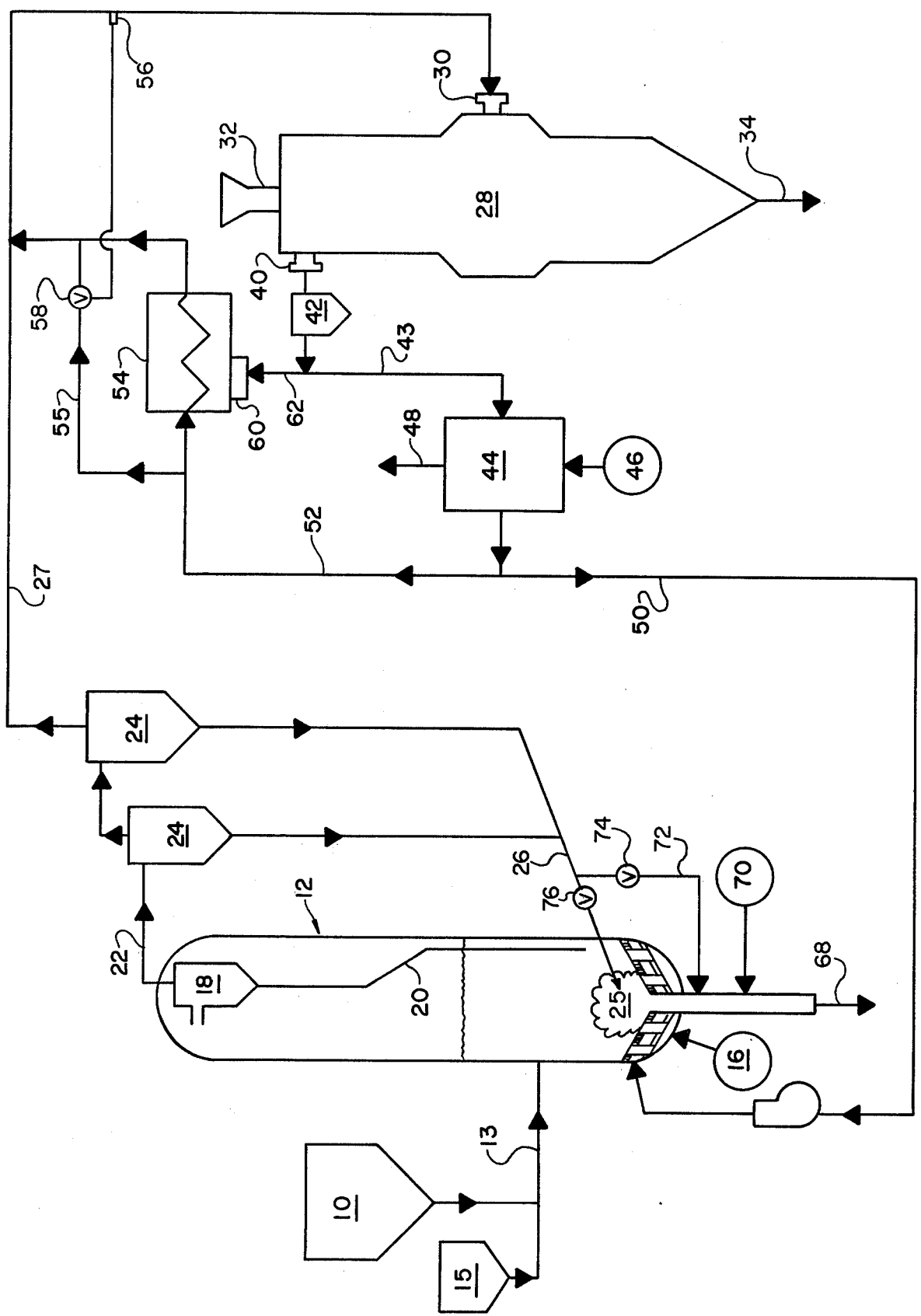

METHOD OF PRODUCING DIRECT REDUCED IRON WITH FLUID BED COAL GASIFICATION

BACKGROUND OF THE INVENTION

The direct reduction of iron ore and pelletized iron oxide by a high temperature reducing gas prepared from natural gas and recycled spent reducing gas has become a significant commercial route toward the production of steel. The high temperature reducing gas prepared from natural gas has a high concentration of reducing constituents, carbon monoxide and hydrogen, as compared to the oxidizing constituents, steam and carbon dioxide. The ratio of these constituents (reducing to oxidizing) is called reducing ratio. As natural gas declines in availability and increases in cost, alternate routes are needed to produce a high temperature reducing as from coal and other fuels such as oil. The growing overdemand for oil, resulting in excessive prices, makes coal the fuel of choice for future processes to produce direct reduced iron from hot reducing gas.

Three basic types of coal gasification are conventionally available on a commercial scale, the entrained bed process, the fixed bed process, and the fluidized bed process.

The entrained bed process produces a reducing gas at about 1500° C. and atmospheric pressure by the concurrent reaction of oxygen and steam with entrained coal dust. The gas from the process has a reducing ratio of about 5 but must be cooled before the gas can be compressed to the approximately two atmospheres of pressure required for direct reduction and also to allow removal of carbon dioxide, water and gaseous sulfur compounds before heating and use in direct reduction. Such cooling, cleaning and subsequent reheating is too costly in both equipment investment and energy loss to make the process highly attractive.

The fixed bed coal gasification process features a descending bed of coal moving countercurrent to an ascending gasification gas stream. The gasification gas is initially oxygen and steam at the bottom grate of the gasifier. As the gasification gases pass up through the descending bed of coal several zones are encountered. The first zone at the bottom discharges ash almost entirely free of carbon from the gasifier. In the next zone gasification gases oxidize the char from the coal to form hydrogen, carbon monoxide and carbon dioxide. In the next higher zone devolatilization of the organic content of the coal takes place as well as some gasification reactions. The gasification gas, now being rich in hydrogen and CO as well as methane and higher hydrocarbons such as naphthas and tars, passes to the next higher level in the bed where dewatering and preheating of the coal bed takes place. The discharge gases therefore contain large quantities of vaporized water, $CO_2$, CO, hydrogen, some methane, naphthas and tars. Before such a gas can be used, the sulfur compounds, steam, $CO_2$, naphthas and tars must be removed. This is best accomplished through the use of low temperature or ambient temperature removal systems. The cooling equipment, the cleaning and subsequent reheating of the gas is expensive, both in equipment investment and energy loss.

As is known to those skilled in the art, the only fully commercial fluid bed process presently available for the gasification of coal operates at atmospheric pressure and produces a gas which contains high concentrations of oxidizing constituents, steam and carbon dioxide. Before this gas can be used in direct reduction it must be cleaned of dust, compressed and then cleaned of carbon dioxide and sulfur compounds. Not only are the cooling and reheating steps expensive, but the gasification process itself is unable to utilize a large fraction of the carbon fed to the gasifier. Char is produced as a by-product and must be used in other processes. Newly developing fluid bed processes carry out the gasification under pressure and one process has a hot zone within the fluid bed where ash is agglomerated and allowed to fall from the bed. Char and ash removed from the discharge gas by a cyclone system is returned to the hot zone to obtain high utilization of the char and to remove the ash in agglomerated form. The purpose of the system is to obtain a high conversion of coal to gas by minimizing the withdrawal of char from the system. Because of the cyclone return system, the process offers the ability to accept fines in the coal feed. Even under the best of conditions however, the gas quality has not exceeded a ratio of 2, primarily because of the need to feed excess steam into the gasifier to cool the char in the fluid bed to prevent agglomeration. As a consequence the gas cannot be used without cooling, purification and reheating. These processes are undesirable for investment and energy reasons.

Note that reducing gas quality is commonly expressed as the ratio of reductants $(CO+H_2)$ to oxidants $(CO_2+H_2O)$ in the gas mixture. In order to take full advantage of the chemical efficiency of a counterflow shaft direct reduction furnace, the qualify of the hot reducing gas introduced to the furnace should be at least about 8.

OBJECTS OF THE INVENTION

It is the principal object of the present invention to provide a method of producing direct reduced iron with gas produced by fluid bed coal gasification.

It is also an object of this invention to eliminate the necessity for reheating gasification gas to reduction temperature prior to entry into a direct reduction furnace.

It is a further object of this invention to provide a process which is capable of accepting coal fines in the feed material.

BRIEF DESCRIPTION OF THE DRAWING

The single FIGURE is a schematic flow sheet of a coal gasification system coupled to a direct reduction furnace in accordance with the invention.

SUMMARY OF THE INVENTION

This invention is a method of producing direct reduced iron with fluid bed coal gasification by fluidized bed gasification of coal, cleaning the gasification gas, mixing it with hot, cleaned top gas, injecting the mixture as reduction gas into a direct reduction shaft furnace, withdrawing reacted reducing gas from the furnace, and cleaning it to form a reductant-rich recycled gas, heating a portion of the recycled gas prior to mixing it with a gasification gas and injecting a second unheated portion of the cooled, cleaned recycled gas into the gasifier to cool the gasification reaction.

By utilizing recycled gas from the direct reduction process as a coolant in the fluidized bed gasification chamber the steam feed required by the gasifier can be drastically reduced and in some cases eliminated. With a concomitant reduction in the percentage of oxidants in the gasification gas product, by increasing the residence time of the coal in the gasifier, using highly reactive coals and utilizing recycled gas as coolant, a high quality reducing gas is produced suitable for direct reduction of iron without any further necessity for upgrading its quality; that is the oxidants need not be further reduced. Lime or some other sulfur acceptors such as calcined dolomite can be pulverized and fed to the fluidized bed along with the pulverized coal to desulfurize the gases formed in the fluidized bed. Thus the gas need not be cooled below the reduction temperature required in a direct reduction furnace. This reduces the power requirement as well as the cost of investment for such a plant.

DETAILED DESCRIPTION

Referring now to the FIGURE, coal which has been crushed to a particle size sufficiently small to obtain good fluidization is fed from bin 10 into fluidized bed gasification chamber 12 via feedpipe 13. All of the coal must be minus 10 mm to obtain good fluidization. If desired, pulverized limestone or other sulfur acceptor is fed from bin 15 through feedpipe 13 to gasification chamber 12. The presence of lime in the bed reduces the sticking tendency of the particles in the bed, allowing higher operating temperatures, which results in better carbon utilization and a higher quality reducing gas product. Oxygen moderated as necessary with steam is fed from source 16 into the bottom of the chamber 12 and upwardly into the fluid bed to fluidize and gasify the material in chamber 12. The gas produced in the gasifier is removed via an internal cyclone 18. Entrained particles in this gas are removed by the cyclone and returned to the lower portion of the gasifier by return pipe 20. The gasifier gas is removed from cyclone 18 by pipe 22 and undergoes further cleaning in any desired number of gas cleaners 24. Particulate materials from gas cleaners 24 are returned to the hot zone 25 at the bottom of the fluid bed by return system 26. The cleaned gasifier gas enters pipe 27 wherein it is mixed with heated recycled gas from a direct reduction furnace to form a reducing gas of suitable temperature for the reduction of iron oxide. The reducing gas mixture is introduced to direct reduction shaft furnace 28 at inlet 30. The shaft furnace has an iron oxide feedpipe 32 at its upper end and a metallized product removal means 34 at its lower end. The operation of the latter causing gravitational flow of the feed material or burden through the furnace. The reducing gas moves in counterflow relation through the burden in the furnace, the reductants carbon monoxide and hydrogen reacting with the oxygen in the iron oxide to chemically reduce the iron to a highly metallized product and forming a top gas containing principally $CO_2$, $H_2O$, $H_2$, $N_2$, $CH_4$ and CO. The reacted top gas is withdrawn from the furnace at outlet 40, undergoes dust removal and substantial water removal in cooler scrubber 42, from whence the major portion of the dust-free cooled top gas is conducted through line 43 to acid gas removal unit 44 in which it is scrubbed to remove a substantial portion of $CO_2$. Steam or some other source of thermal energy 46 passes through the acid gas removal unit 44 for regeneration of the scrubbing fluid. Exhaust acid gases such as $CO_2$ and $H_2S$ are removed from the system through pipe 48. The acid gas removal process produces a recycled gas rich in hydrogen and carbon monoxide which is divided, a portion entering pipe 50 which is fed back to the bottom of the gasification chamber to control the temperature of the bed by absorbing the exothermic heat of reaction between the oxygen and coal in the bed. The remaining portion of the cooled recycled gas enters line 52 for mixing with gasification gas in pipe 27 to form reducing gas. Part of the recycled gas is heated in heater 54 while the remaining part bypasses the heater in line 55 then is recombined with the hot recycled gas to control the temperature of the reducing gas. The temperature of the gas is measured by thermocouple 56 which is connected to valve 58 for controlling the amount of cooled gas in pipe 55 to temper the reducing gas stream. Heater 54 is fired by burner 60 which uses a portion of the dust-free spent reducing gas from line 62 as burner fuel.

In the gasification chamber 12 the upwardly flowing oxygen from source 16 reacts with the coal to produce a reducing gas. Oxygen, moderated as necessary with steam, from source 70 is injected into the ash removal system and reacts with the char formed from the hot coal to form hot zone 25 where the ash particles agglomerate under controlled conditions. As the agglomeration continues, the particles form agglomerates of a size sufficient to fall from the bed into discharge system 68.

As an alternative to the fines return from cyclones 24 to hot zone 25 as discussed above, all or part of the fines from pipe 26 may be directed through pipe 72 into the upflowing stream of oxidants from source 70. The location of fines injection is controlled by valves 74 and 76.

The invented method of fluid bed coal gasification production of reducing gas for direct reduction of iron has significant advantages over the commercially available fluid bed gasification process wherein gasified gases are cooled, cleaned of carbon dioxide, steam and hydrogen sulfide, then reheated along with cleaned, cooled spent top gas from a direct reduction furnace to form the reducing gas for direct reduction. In the present method a significant portion of the recycled gas is reheated while acting as a coolant for the fluid bed gasification reaction in the gasification chamber. The present process is capable of obtaining up to 95% coal utilization as measured by loss of carbon in the ash and in the discharge gases from the cyclone system. Since there is no need for cooling the gas produced in the gasifier or for purifying the gasifier gases to remove carbon dioxide, hydrogen sulfide or water, such cooling and purification equipment is eliminated with an attendant savings in equipment investment. Since the gasification gases are not cooled, equipment for reheating gasification gases is unnecessary. The two sources of heat for bringing the reducing gas to reduction temperature are the gasification chamber itself and recycle gas reheater 54. The recycle gas reheater is much smaller than reheaters used in commercially available processes because so much less gas is required to be reheated in the present process. The invented method is also capable of accepting fines in the coal feed because the fluidized bed and cyclone system are readily capable of handling them. Fines are normally eliminated from coal gasification systems.

EXAMPLE

As an example, Table I compares the process flow rates using purified recycle top gas from pipe 50 as a coolant in the fluid bed gasifier (Case A), with the use of steam as a coolant (Case B) for the production of one tonne of direct reduced iron having a 92% metallization.

In both Cases the process conditions are as nearly alike as possible and the raw gas in conduit 27, as produced from the gasifier 12, is at 1010° C. The hot raw gas is used without removal of carbon dioxide.

TABLE I

FLOW RATES

GASIFIER (NCM is defined as cubic meters of gas at 0° C. and a pressure of 760 mm of Hg)

|  |  | CASE A | CASE B |
|---|---|---|---|
| Coal Feed |  |  |  |
| (Gross heating value 6943 Kcal/kg) | kg | 436 | 540 |
| Steam | NCM | 43.6 | 432.0 |
| Oxygen | NCM | 241.7 | 289.3 |
| Recycle | NCM | 305.2 | 0.0 |
| Raw Gas Product | NCM | 1092.9 | 1337.6 |
| GAS PROCESSING AND REDUCTION |  |  |  |
| Bustle gas (into 30) | NCM | 1859.1 | 3126.6 |
| Top gas (from 40) wet | NCM | 1886.6 | 3166.9 |
| Scrubbed top gas (from 42) | NCM | 1777.1 | 2795.4 |
| Top gas fuel (in 62 and to generate steam for $CO_2$ removal) | NCM | 290.7 | 522.8 |
| To $CO_2$ removal (to 44) | NCM | 1486.5 | 2272.6 |
| $CO_2$ removed (in 48) | NCM | 354.7 | 408.1 |
| Product from $CO_2$ removal (from 44) | NCM | 1055.2 | 1749.1 |
| Recycle to gasifier (in 50) | NCM | 305.2 | 0 |
| Steam to $CO_2$ removal (in 46) | kg | 674.0 | 775.1 |

For simplicity the top gas used as fuel to produce the steam 46 for $CO_2$ removal is not shown in the figure.

The savings in coal, recycle gas handling and oxygen are readily apparent.

In the examples raw gas is prepared from a coal having an ultimate analysis of 72.2% C, 4.5% H, 1.3% N, 6.8% O, 3.1% S and 12.1 weight percent ash on a dry basis. The gross heating value is 6943 Kcal/kg. The raw gas produced from the gasifier has a composition as shown in Table II.

TABLE II

RAW GAS COMPOSITION (vol. %)

|  | CASE A | CASE B |
|---|---|---|
| CO | 59.56 | 33.41 |
| $CO_2$ | 3.88 | 14.97 |
| $H_2$ | 28.14 | 29.86 |
| $H_2O$ | 2.41 | 17.61 |
| $CH_4$ | 3.90 | 3.30 |
| $N_2$ + Ar | 2.11 | 0.86 |
| Total | 100 | 100 |
| Quality $\left(\dfrac{reductants}{oxidants}\right)$ | 13.9 | 1.9 |

Note the significant improvement in quality of the raw gas in conduit 27 of Case A over that of Case B.

The $N_2 + Ar$ in the oxygen feed to the gasifier was assumed to be 2%.

The temperature of the raw gas in conduit 27 is 1010° C. in both cases and the bustle gas temperature in inlet 30 is adjusted to 815° C. by the heater 54 and cold gas in line 55.

From the foregoing, it is readily apparent that we have invented a method for producing direct reduced iron by utilizing a fluidized bed coal gasification system which is readily able to accept finely divided coal and which more efficiently utilizes the heat in the system.

What is claimed is:

1. A method of producing direct reduced iron with fluid bed coal gasification, comprising:
   (a) introducing particulate coal to a fluidized bed, ash agglomerating, gasification chamber;
   (b) reacting said coal at high temperature in the presence of oxygen to form a gasification gas;
   (c) withdrawing the gasification gas from said chamber;
   (d) removing particulate materials from said gasification gas;
   (e) mixing the dust-free gasification gas with hot, cleaned top gas from a direct reduction furnace to form a heated reducing gas;
   (f) introducing said heated reducing gas to a direct reduction shaft furnace to reduce the iron oxide therein to a highly metallized iron product and to form a reacted top gas;
   (g) withdrawing said reacted top gas from said furnace;
   (h) removing acid gases from said reacted top gas to produce a hydrogen and carbon monoxide rich recycle gas;
   (i) reheating a portion of said recycle gas prior to mixing it with said dust-free gasification gas; and
   (j) injecting a second portion of said cooled, cleaned recycled gas into the fluidized bed within said gasification chamber to cool the reaction within said chamber.

2. A method according to claim 1 further comprising tempering said heated recycle gas with unheated recycle gas prior to forming the reducing gas mixture.

3. A method according to claim 1 further comprising introducing a particulate sulfur acceptor to said chamber with said coal.

4. A method according to claim 3 wherein said sulfur acceptor is limestone.

5. A method according to claim 1 wherein said particulate coal is all minus 10 mm in size.

6. A method according to claim 1 further comprising cleaning and cooling said top gas after withdrawing said reacted top gas from said furnace.

* * * * *

UNITED STATES PATENT AND TRADEMARK OFFICE
CERTIFICATE OF CORRECTION

PATENT NO. : 4,260,412

DATED : April 7, 1981

INVENTOR(S) : Frank V. Summers; David C. Meissner & John C. Scarlett

It is certified that error appears in the above—identified patent and that said Letters Patent is hereby corrected as shown below:

Column 1, line 18, change "as" (first occurrence) to -- gas -- .

Column 2, line 30, change "qualify" to -- quality -- .

Column 5, line 28, change "775.1" to -- 775.4 -- .

Signed and Sealed this

Fifteenth Day of December 1981

[SEAL]

Attest:

GERALD J. MOSSINGHOFF

Attesting Officer

Commissioner of Patents and Trademarks